United States Patent Office 3,431,290
Patented Mar. 4, 1969

3,431,290
PREPARATION OF CARBONATE ESTERS
Thomas N. Hall, Adelphi, Md., assignor to the United States of America as represented by the Secretary of the Navy
No Drawing. Filed Oct. 30, 1964, Ser. No. 407,929
U.S. Cl. 260—463          6 Claims
Int. Cl. C07c 69/76, 69/00

The invention described herein may be manufactured and used by or for the Government of the United States of America for governmental purposes without the payment of any royalties thereon or therefor.

This invention relates to a novel method for preparing symmetrical organic carbonates of complex, negatively-substituted carbinols. In particular, the novel method of this invention is directed to the preparation of the bis carbonates or polycarbonates of complex aliphatic and/or aromatic mono- and poly-carbinols in which the beta carbon atom contains negative groups such as halogen and/or nitro groups.

Accordingly the object of this invention is to provide a novel method for the preparation of the carbonates of carbinols having a negatively-substituted beta carbon atom.

The object of this invention is accomplished by reacting a carbinol containing a negatively-substituted beta carbon atom with an acid halide in the presence of pyridine N-oxide.

The carbinols contemplated as the starting material for the preparation of carbonates may be designated by the general formulae, (1)   $ZCX_2CH_2OH$ and (2) 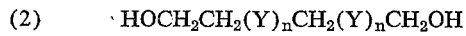 $HOCH_2CH_2(Y)_nCH_2(Y)_nCH_2OH$ where Z is H, halo, nitro, alkyl, aryl, aralkyl and alkaryl containing from about 1 to about 15 carbon atoms; X is a negative group such as a nitro or halogen group or a combination thereof; Y is oxygen, methylene, substituted methylene, arylene, substituted arylene and $n$ is 0 to 7 when Y is methylene, substituted methylene, arylene or substituted arylene.

By way of illustration, carbinols embraced by general Formula 1 include 2,2-difluoroethanol, 2,2-dinitropropanol, 2,2-dinitrobutanol, phenyl-2,2-dinitroethanol, xylyl-2,2-dinitroethanol, 2,2,2-trinitroethanol, 2-fluoro-2,2-dinitroethanol and 2-chloro-2,2-dinitroethanol. Carbinols embraced within Formula 2 includes 4,4-dinitro-1,7-heptanediol, 2,2,8,8-tetranitro-1,9-nonanediol, 2,2,8,8-tetranitro-4,6-dioxa-1,9-nonanediol, 2,2-dinitro-1,3-propanediol, 2,2,4,4 - tetranitro - 1,5-pentanediol 2-methyl-2-nitro-1,3-propanediol, and 2,2,6,6-tetranitro-1,7-heptanediol and the like.

The acid halide esterifying agents used in the method of this invention are comprised of acid halides which include phosgene, acyl halides and aroyl halides, such as acetyl chloride, benzoyl chloride and the like. By controlling the flow rate of the chosen acid halide, the rate of reaction and the rate of heat evolution may be regulated. In order to insure complete esterification, normally an amount of phosgene in excess of stoichiometric requirements is used. In order to simplify work-up, stoichiometric quantities of acyl and aroyl halides are used.

The reaction between the carbinol and the acid halide, according to this invention, is preferably carried out in a chloroparaffin diluent such as trifluorotrichloroethane, methylene chloride, chloroform or mixtures thereof. The diluent should be one which has a relatively low boiling point in order to facilitate work-up of the product and should be nonreactive with the acid halide to avoid competing reactions. For example, the use of esters such as ethyl acetate would be unsuitable because of the probability of the occurrence of trans esterification.

Preferably the diluent, the acid halide, and the carbinol should be free of water since the carbinols used as starting materials may partially dissociate in water thereby reducing the total amount of carbinol available for esterification.

Although the carbinols are sensitive to water and may partially dissociate therein it is merely necessary that the reactants be dry in order to overcome this tendency to dissociate. Thus it is not necessary that the reaction be run under the protection of an inert atmosphere. The temperature of the esterification is not critical and thus the reaction will perform satisfactorily at temperatures above and below 0° C. Since the reaction is exothermic, one would run it at temperatures conducive to a controlled rate of reaction. Similarly the only limitation as as to the minimum operable temperature is the effect of the temperature on the solubility characteristics of the reactants. Generally, however, a temperature range of from about 10°–35° C. will produce the best results in terms of simplicity of equipment setup while a range of about 10°–15° C. produces the higher yields of carbonate product.

If a negatively-substituted carbinol and an acid halide are reacted in the absence of a catalyst, little or no reaction will take place. In the presence of a catalyst, however, the normally stable carbinol is apparently activated. However, it may be that the acid halide forms a complex with the catalyst such complex being readily reactive with the carbinol, or the carbinol forms a complex with the catalyst which then reacts with the acid halide.

The catalyst used in the method of this invention, and without which reaction will not take place, is pyridine N-oxide. The amount of pyridine N-oxide used is that amount which is needed to react with the hydrogen halide which would be formed by complete esterification of the carbinol. Generally about 1 to 10 moles of catalyst may be added per equivalent of esterifiable hydroxyl present in the reaction mixture. As with the acid halide and diluent, the catalyst should preferably be free of water in order to obtain best results in terms of yield.

The esterification reaction is considered to be complete upon the cessation of exotherm and the product may then be recovered by precipitation upon the addition of a paraffin such as hexane to the reaction mixture if a chloroparaffin diluent is used.

The invention will be more clearly understood by reference to the following specific embodiments which are herein included only for illustrative purposes and are not intended to be regarded as an indication of the scope of the invention.

Example I

This example illustrates the preparation of bis(2,2,2-trinitroethyl) carbonate by the reaction of 2,2,2-trinitroethanol with phosgene in the presence of pyridine N-oxide.

An amount of 10 gms. of 2,2,2-trinitroethanol and 5.25 grams of pyridine N-oxide were dissolved in a mixture of 6 ml. of methylene chloride and 13 ml. of chloroform in a 50 ml. beaker. Phosgene gas was bubbled into the stirred solution at a rate of about 18 cc./min. for 90 minutes at a temperature of about 25° C. The reaction was then stirred for 60 minutes at about 25° C. and poured slowly into 50 ml. of n-hexane with stirring. The resultant precipitate was allowed to settle, the n-hexane was decanted and the precipitate was stirred with 50 ml. of ice. After the ice had melted, the solid white bis(2,2,2-trinitroethyl) carbonate was collected by filtration, washed with water and dried. The product was obtained in 76% yield and had a melting point of 114° C. Indentification was confirmed by X-ray powder diffraction pattern.

Example II

This example illustrates the preparation of bis(2,2-dinitropropyl) carbonate by the reaction of 2,2-dinitropropanol with phosgene in the presence of pyridine N-oxide.

The procedure was identical with Example I except that 8.31 grams of 2,2-dinitropropanol and 5.25 grams of pyridine N-oxide were reacted, in a chloroparaffin diluent, with phosgene. The product, bis(2,2-dinitropropyl) carbonate, was obtained in 43% yield and had a M.P. of 117° C.

Example III

This example illustrates the preparation of bis(2-fluoro-2,2-dinitroethyl) carbonate by the reaction of 2-fluoro-2,2-dinitroethanol with phosgene in the presence of pyridine N-oxide.

Again, the procedure was identical with Example I except that 8.51 grams of 2-fluoro-2,2-dinitroethanol and 5.25 grams of pyridine N-oxide were reacted, in a chloroparaffin diluent, with phosgene. The product, bis(2-fluoro-2,2-dinitroethyl) carbonate, was obtained in 45% yield and had a melting point of 46° C.

Obviously, many modifications and variations of the present invention are possible in the light of the above teachings. It is therefore to be understood that, within the scope of the appended claims, the invention may be practiced otherwise than as specifically described.

Having thus described the invention, what is claimed and desired to be secured by Letters Patent of the United States is:

1. A process for preparing the carbonate of a substituted carbinol selected from the group consisting of 4,4-dinitro-1,7-heptanediol, 2,2,8,8-tetranitro-1,9-nonanediol, 2,2,8,8-tetranitro-4,6-dioxa-1,9-nonanediol, 2,2-dinitro-1,3-propanediol, 2,2,4,4-tetranitro-1,5-pentanediol, 2 methyl-2-nitro-1,3-propanediol, 2,2,6,6-tetranitro-1,7-heptanediol and carbinols represented by the structural formula $ZCX_2CH_2OH$ wherein Z is selected from the group consisting of hydrogen, nitro, alkyl, aryl, aralkyl, and alkaryl and X is selected from the group consisting of nitro and a mixture of halo and nitro which comprises reacting said carbinol with phosgene in the presence of pyridine N-oxide.

2. The process of claim 1 wherein said pyridine N-oxide is present in an amount from about 1–10 moles per equivalent of esterifiable hydroxyl present in the reaction mixture.

3. The process of claim 1 wherein the reaction is carried out in a chloroparaffin diluent.

4. The process of claim 3 wherein said carbinol is 2,2-dinitropropanol.

5. The process of claim 3 wherein said carbinol is 2-fluoro-2,2-dinitroethanol.

6. The process of claim 3 wherein said carbinol is 2,2,2-trinitroethanol.

References Cited

UNITED STATES PATENTS 2,959,611  11/1960  Nelson et al. _____ 260—463
3,124,606   3/1964  Anderson et al. _____ 260—463

DANIEL D. HORWITZ, *Primary Examiner.*

U.S. Cl. X.R.

260—488, 476